United States Patent
Bruesch et al.

[11] 3,971,624
[45] July 27, 1976

[54] CONTROLLABLE ELECTROCHROMIC INDICATOR DEVICE WITH IONIC CONDUCTING INTERMEDIATE LAYER AND NON-POLARIZABLE ELECTRODES

[75] Inventors: Peter Bruesch, Nussbaumen; Fritz Lehmann, Baden; Claus Schuler, Widen; Hans-Rudolf Zeller, Birr, all of Switzerland

[73] Assignee: BBC Brown Boveri & Company Limited, Baden, Switzerland

[22] Filed: May 6, 1975

[21] Appl. No.: 575,008

[30] Foreign Application Priority Data
June 12, 1974 Switzerland.................... 8011/74

[52] U.S. Cl................................................. 350/160 R
[51] Int. Cl.²............................ G02B 5/23; G02F 1/36
[58] Field of Search...................................... 350/160

[56] References Cited
UNITED STATES PATENTS

| | | | |
|---|---|---|---|
| 3,521,941 | 7/1970 | Deb et al........................ | 350/160 P |
| 3,712,710 | 1/1973 | Castellion....................... | 350/160 P |

*Primary Examiner*—William L. Sikes
*Attorney, Agent, or Firm*—Oblon, Fisher, Spivak, McClelland & Maier

[57] ABSTRACT

A controllable electrochromic indicator device is disclosed which includes two electrodes, an electrochromic layer and an adjacent charge-carrier-transmitting insulator layer situated between the two electrodes and at least one of the electrodes being deposited on a supporting plate and at least one of the electrodes being transparent. The charge carrier transmitting insulator layer is a good ion conductor and functions to almost completely block the flow of electrons. At least one of the electrodes is non-polarizable and is disposed in direct contact with the ion conductor.

24 Claims, 1 Drawing Figure

CONTROLLABLE ELECTROCHROMIC INDICATOR DEVICE WITH IONIC CONDUCTING INTERMEDIATE LAYER AND NON-POLARIZABLE ELECTRODES

BACKGROUND OF THE INVENTION

1. Field of the Invention

The present invention concerns a controllable electrochromic indicator device consisting of an electrochromic layer and an adjacent charge-carrier-passing insulating layer located between two electrodes with at least one of the two electrodes attached to a supporting plate and at least one of the electrodes being transparent.

2. Description of the Prior Art

Such indicator devices are already known from U.S. Pat. No. 3,521,941. A particular embodiment is shown in FIG. 1. On a supporting plate 1, e.g., of glass or another transparent material, there are deposited in succession thin layers of tin oxide ($SnO_2$) as a transparent electrode 2, molybdenum oxide ($MoO_3$) as an electrochromic substance 3, silicon oxide (SiO) as a charge-carrier-passing insulator 4 and gold (Au) as the second electrode 5. A voltage AB of about 6V with the proper polarity applied to the electrodes 2, 5, the thickness of the charge-carrier-passing insulating layer 4 being about 0.2 $\mu$ and that of the electrochromic layer being about 1 $\mu$, produces a blue coloration of the previously almost colorless indicator device after about 30 seconds. The color fades away about 15 seconds after reversal of the polarity of the voltage.

The charge carrier transmitting insulation layer 4 on the one hand is to prevent a short circuit between electrodes 2 and 5, but on the other hand it is also to supply a sufficient flow of charge carriers to the electrochromic layer 3. A satisfactory number of charge carriers pass through the insulating layer 4 only at very high field strengths, so as to produce coloration of the electrochromic layer 3. Since the speed of coloration and thus the response time of the device is determined by the number of charge carriers reaching the electrochromic layer per unit time and the field strength cannot be made arbitrarily high, such indicator devices exhibit a slow response and must always be operated at high field strengths, i.e., at relatively high voltages and very small thicknesses of the charge-carrier-transmitting layer 4. Moreover, electrolytic deposits form on the electrodes of such indicator devices in the course of time, thus shortening the lifetime of the electrochromic cell.

SUMMARY OF THE INVENTION

It is an aim of the invention, therefore, to develop a controllable electrochromic indicator device distinguished by a high time resolution even at low field strengths, endowed at the same time, however, with a high life expectancy through reversible coloration of the electrochromic layer and suitable configuration.

The aforementioned aim is attained in accordance with the invention by making the charge-carrier-passing insulation layer a good ion conductor with almost complete blockage against the passage of electrons, and by providing at least one non-polarizable electrode, preferably disposed next to the ion conductor.

With the use of good ion conductors as the charge-carrier-transmitting insulating layer, the color-producing ions pass out of the ion conductor into the electrochromic layer in sufficient quantity even with the application of a small voltage. The thickness of the ion-conducting layer is no longer so critical and can now be up to 30$\mu$ instead of 0.2$\mu$. Along with easier fabrication of the indicator device, significantly improved insulation between the electrodes is attained, since the insulating inter-layer is thicker and exhibits none of the "patchiness" of thin films. By the inclusion of a non-polarizable electrode, deposits occurring at the electrodes of a state-of-the-art indicator device are avoided since, e.g., cationic secondary reactions produced at the junction of the cathode and the charge-carrier-transmitting insulation layer in which metals may be deposited are suppressed.

Particularly suitable for non-polarizable electrodes is a mixed ion-electron-conductor, e.g., a tungsten and/or molybdenum bronze with the composition $M_xY$, where $0 < X < 1$ and M = alkali-alkaline earth metals, Cu, Ag, $NH_4$ or H and Y = $WO_3$, $MoO_3$ and $WO_3/MoO_3$, since in such a device reactive cations leaving the ion conductor are absorbed by the cathode and incorporated in the molecular structure of the bronze. In this way contact surface reactions of the cations with water or oxygen and thus the accumulation of troublesome deposits are avoided.

The foregoing and other objects are attained in accordance with one aspect of the present invention through the provision of a controllable electrochromic indicator device comprising: two electrodes, an electrochromic layer and an adjacent charge-carrier-transmitting insulator layer situated between the two electrodes, at least one of the electrodes being deposited on a supporting plate and at least one of the electrodes being transparent, the charge-carrier-transmitting insulator layer being a good ion conductor and functioning to almost completely block the flow of electrons, and at least one of the electrodes being non-polarizable and disposed in contact with the ion conductor.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings in which.

DETAILED DESCRIPTION OF THE PREFERRED EMBODIMENTS

Figure 1:
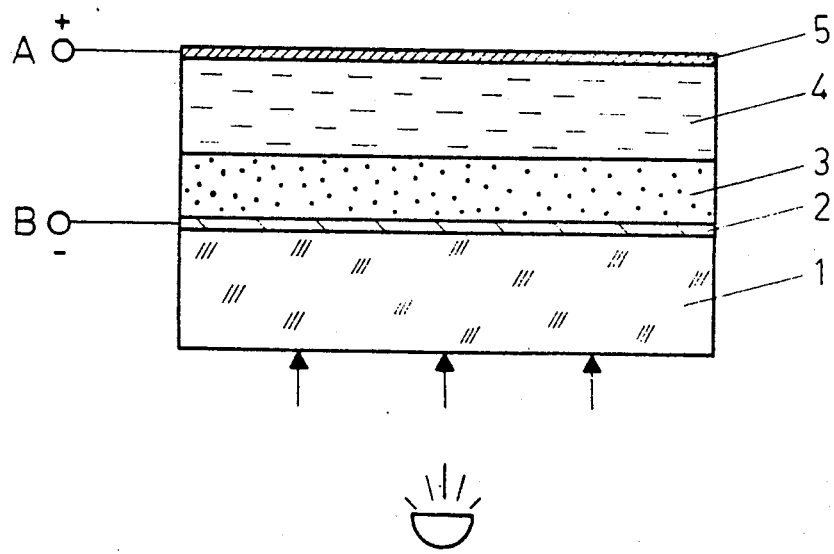
FIG. 1 is a section through a state-of-the-art electrochromic indicator device.
Figure 2:
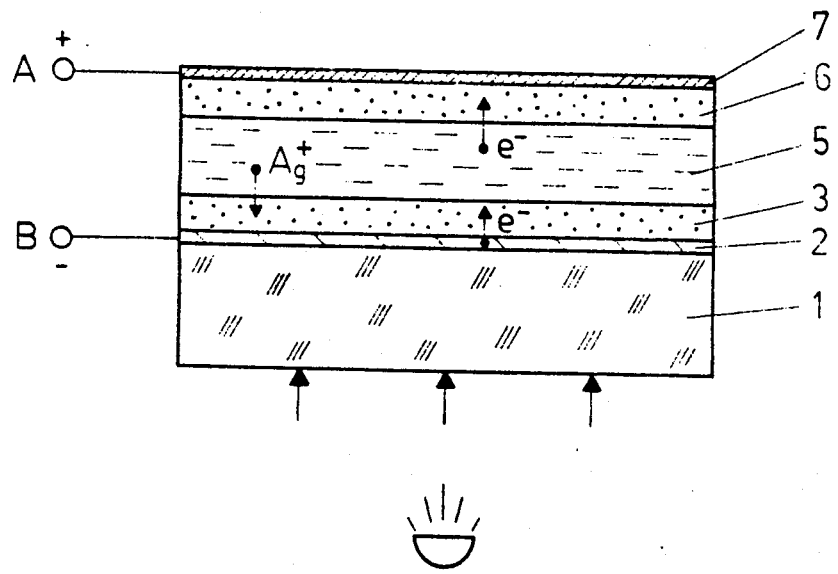
FIG. 2 is a section through an electrochromic indicator device conforming to the invention.

Referring now to the drawings, wherein like reference numerals designate identical or corresponding parts throughout the several views, and more particularly to FIG. 2 thereof, in FIG. 2 are shown applied to a supporting plate 1, and referenced by numbers 2, 3, 5, 6 and 7, layers of tin oxide ($SnO_2$)2, tungsten trioxide ($WO_3$)3, silver iodide (AgI) 5, tungsten trioxide ($WO_3$) 6 and gold 7. The supporting plate 1 is preferably of glass, but any other transparent material, e.g., plastic, could be used. The tin dioxide layer 2 deposited on the glass plate 1 is transparent and serves as an electrode. The first electrochromic film 3 of $WO_3$ is evaporated on in a high vacuum of about $10^{-6}$ Torr from a platinum-alloy boat electrically heated to about 300°C and it has a thickness of about 5$\mu$. The ion-conducting silver iodide layer 5 of about $5\mu$ thickness, in contrast, is evaporated onto the tungsten trioxide film at room temperature. Its film thickness is not very critical and can amount to as much as $50\mu$. The adjoining second electrochromic layer 6 is applied at room temperature and has the same thickness as the film 2. The final layer 7 of gold is about $1\mu$ thick and provides the connection between the terminal A of a D.C. voltage source of about 3 V and the electrochromic layer 6 functioning as an electrode. The other terminal B of the D.C. voltage source is connected to the electrode 2.

If electrode 6 is at a positive potential, the $WO_3$-layer 3 turns blue after about 5 seconds. An explanation of this phenomenon is probably that the silver ions Ag+ are formed in sufficient quantity in the silver iodide layer by the electric field and carried into the tungsten trioxide layer 3. Since charge neutrality must be maintained in the layers of the indicator device, electrons are supplied to the electrochromic layer 3 by the cathode 2 which causes a reduction of silver ions and tungsten trioxide to blue tungsten bronze. The excess negative charge carriers of the ion-conducting silver iodide layer 5 are drawn off by the $WO_3$-layer 6 acting as anode. The tungsten bronze $Ag_x WO_3$, formed in the layer 3 exhibits various degrees of blue coloration for all $x$-values between 0 and 0.3, with bronzes of small $x$-values giving only a slight coloration to the initially colorless tungsten trioxide. The blue color is readily visible through the glass plate 1 and the tin dioxide electrode 2.

When the polarity of the voltage is reversed the coloring of the tungsten trioxide layer 3 disappears again in about 5 seconds. This process is most likely attributable to the formation of sufficient silver ions in the ion-conducting silver iodide film 5 and their transport into the tungsten trioxide layer 6. Thus, a gradient in the concentration of silver ions in the silver iodide layer develops so that silver ions diffuse through the ion-conducting layer 5 from the silver-rich region next to the electrochromic layer 3 to the silver-poor one next to the electrochromic layer 6. The surface of the silver iodide film 5 next to the electrochromic layer 3 now has too low a concentration of silver ions, so that silver ions diffuse into this region from layer 3. These ions are formed by oxidation of the tungsten bronze at the tin dioxide anode 2, and are continuously removed from the electrochromic layer 3 by reason of the electric field and the silver ion deficit in the contact surface of the ion conductor, so that the coloration almost completely disappears and only the yellowish silver iodide surface is visible. Of course, the electrochromic film 6 turns blue while the film 3 is losing its coloration, but this cannot be detected by an observer, since only the yellowish silver iodide film 5 is visible through the transparent bleached tungsten trioxide film 3.

Such a cell works reversibly and is still usable after several weeks' operation, since no elementary silver is deposited and thus short circuiting as well as discoloration and color suppression are avoided. It is most important for satisfactory operation of the cell that layer 5 be the best possible ion conductor, e.g., with a specific conductivity between $10^{-1}$ and $10^{-10}$ $\Omega^{-1}$ $cm^{-1}$, and that it block the passage of electrons almost completely, thereby permitting a sufficiently high electric field to be established. Such a cell with a display area of about 0.1 $cm^2$ in the above-described example draws about $300\mu$ A.

Together with silver iodide all the other ion-conducting crystals like $\beta$-alumina are candidates for the ion conductor, especially those which do not diffuse the ions $Li^+$, $Na^+$, $K^+$, $Rb^+$, $Cs^+$, $Be^{++}$, $Mg^{++}$, $Ca^{++}$, $Ba^{++}$, $Sr^{++}$, $H^+$, $NH_4^+$, $Cu^+$ or $Ag^+$ into an electrochromic layer, e.g. LiCl, CuBr, CuI and $Rb_4AgI_5$. Also very suitable are glasses with high ionic conductivity such as $SiO_2$—$B_2O_3$ glasses. Thus according to K. Otto, Physics and Chemistry of Glasses 7/1966/29, the ionic conductivity of a glass with the composition $25Li_2O + 50 SiO_2 + 25 B_2O_3$ is between $10^{-4}$ and $2 \times 10^{-4}$ $\Omega^{-1}$ $cm^{-1}$ at room temperature and that of a glass with the composition $35 Li_2O + 28 Li_2SO_4 + 7(LiCl)_2 + 4SiO_2 + 26B_2O_3$ is about $5 - 10 \times 10^{-3}$ $\Omega^{-1}$ $cm^{-1}$. The advantages of such glasses over the crystalline ion conductors are above all that very thin but defect-free layers can be produced by cathodic sputtering or even by simple screen-print enameling techniques and that their ionic conductivity is not significantly impaired by random structural characteristics, such as occur in the production techniques for thin films, since they are already amorphous or polycrystalline. In addition such glasses give the indicator device a long life expectancy since, on account of their amorpous or polycrystalline structure, a structural change is hardly to be feared even with very frequent charge/discharge cycles. Ion conducting polymers, like perfluorated sulfonic acid, are also suitable ion conductors.

Satisfactory electrochromic materials, besides tungsten trioxide, are all oxides and oxide mixtures of the metals manganese, molybdenum, niobium, palladium, platinum, rhenium, titanium vanadium and tungsten, particularly $MoO_3$ and $WO_3$.

For use as non-polarizable electrodes there are the bronzes of the composition $MxY$ where M = Li, Na, K, Rb, Cs, Be, Mg, Ca, Ba, Sr, H, $NH_4$, Cu and Ag, Y = $WO_3$ $MoO_3$ and $WO_3/MoO_3$ and $x$ lies between 0 and 1; further, hydrogen-bearing palladium and platinum, as well as graphite-alkali metal alloys like $CNa_x$ with $x < 0.1$, and sulfides and selenides of silver and tungsten, like $Ag_2S$, $Ag_2Se$, $WS_2$ and $WSe_2$ with a slight alkali admixture are quite suited. Such bronzes furnish both ions and electrons and, at small $x$-values, change color or effect color changes in unbronzed electrochromic layers. At high $x$-values they contribute to a good color contrast with transparent ion conductors. If for electrode 6 opposite the observer something like $Li_xWO_3$ is used, with $x \approx 0.7 - 0.85$, and for the ion conductor a transparent ion conducting glass, like $SiO_2$ — $B_2O_3$, is used then, with bleached front electrochromic layer 3, the gold-yellow color of the background is visible, which presents a sharp color contrast to the blue-green color of a partially decolorized electrochromic layer 3.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by letters patent of the United States is:

1. A controllable electrochomic indicator device comprising:
   two electrodes,
   an electrochromic layer and an adjacent charge-carrier-transmitting insulator layer situated between the two electrodes, at least one of the electrodes being deposited on a supporting plate and at least one of the electrodes being transparent, the charge carrier transmitting insulator layer being a good ion conductor and functioning to almost completely block the flow of electrons, and at least one of the electrodes being non-polarizable and disposed in contact with the ion conductor.

2. A controllable electrochomic indicator device as in claim 1 wherein the specific ionic conductivity of the ion conductor lies approximately between $10^{-1}$ and $10^{-10}$ $\Omega^{-1}$ cm$^{-1}$ and its film thickness can be as much as 20 $\mu$.

3. A controllable electrochromic indicator device as in claim 1 wherein the ion conductor is a crystalline substance.

4. A controllable electrochromic indicator device as in claim 3 wherein the crystalline substance is silver iodide.

5. A controllable electrochromic indicator device as in claim 3 wherein the crystal is $Li_2SO_4$, CuBr, CuI, $Rb_4AgI_5$ or $\beta$-alumina.

6. A controllable electrochromic indicator device as in claim 1 wherein the ion conductor is an amorphous or polycrystalline substance.

7. A controllable electrochromic indicator device as in claim 6 characterized by the fact that the amorphous substance is a $SiO_2$—$B_2O_3$ glass.

8. A controllable electrochromic indicator device as in claim 7 wherein the $SiO_2$—$B_2O_3$ glass has approximately the mole percent composition $25Li_2O + 50SiO_2 + 25B_2O_3$.

9. A controllable electrochromic indicator device as in claim 7 wherein the $SiO_2$—$B_2O_3$ glass has approximately the mole percent composition $35Li_2O + 28Li_2SO_4 + 7(LiCl)_2 + 4SiO_2 + 26B_2O_3$.

10. A controllable electrochromic indicator device as in claim 1 wherein the ion conductor is an ion-conducting polymer.

11. A controllable electrochromic indicator device as in claim 10 wherein the polymer is perflouorated sulfonic acid.

12. A controllable electrochromic indicator device as in claim 1 wherein the electrochromic layer comprises oxides and oxide mixtures of the metals manganese, molybdenum, niobium, palladium, platinum, rhenium, titanium, vanadium or tungsten.

13. A controllable electrochromic indicator device as in claim 12 wherein the oxides and oxide mixtures comprise $WO_3$, $MoO_3$, and/or $WO_3/MoO_3$.

14. A controllable electrochromic indicator device as in claim 1 wherein the non-polarizable electrode is a mixed ion-electron conductor.

15. A controllable electrochromic indicator device as in claim 14 wherein the mixed ion-electron conductor is a tungsten and/or molybdenum bronze.

16. A controllable electrochromic indicator device as in claim 15 wherein the bronze has the composition M$x$Y, where $0 < x < 1$ and M = Li, Na, K, Rb, Cs, Be, Mg, Ca, Ba, Sr, H, NH$_4$, Cu or Ag while Y = $WO_3$, $MoO_3$ or $WO_3/MoO_3$.

17. A controllable electrochromic indicator device as in claim 14 wherein the mixed ion-electron conductor is an electrochromic layer.

18. A controllable electrochromic indicator device as in claim 16 wherein the non-polarizable electrode is Ag$_x$ Y or Li$_x$ Y, where Y = $WO_3$, $MoO_3$, $WO_3/MoO_3$ and $0 < x < 1$.

19. A controllable electrochromic indicator device as in claim 18 wherein the proportion $x$ of Ag or Li in the non-polarizable electrode is between 0.7 and 0.85.

20. A controllable electrochromic indicator device as in claim 18 wherein the proportion $x$ of Ag or Li in the electrochromic layer is between 0 and 0.3.

21. A controllable electrochromic indicator device as in claim 17 wherein the two electrochromic layers are similar.

22. A controllable electrochromic indicator device as in claim 14 wherein the mixed ion-electron conductor contains hydrogen-bearing platinum and/or palladium.

23. A controllable electrochromic indicator device as in claim 14 wherein the mixed ion-electron conductor contains graphite-alkali metal alloys or selenides and sulfides of silver and tungsten.

24. A controllable electrochromic indicator device as in claim 1 wherein the non-polarizable electrode is coated at least partially on the rear surface with a metallic contact film.

* * * * *